United States Patent [19]

Sakamoto

[11] Patent Number: 5,124,793
[45] Date of Patent: Jun. 23, 1992

[54] SOUND MULTIPLEX SIGNAL ENCODER CIRCUIT WITH CONTROLLED AFC OPERATIONS

[75] Inventor: Yoshiaki Sakamoto, Honjo, Japan

[73] Assignee: Kabushiki Kaisha Toshiba, Kawasaki, Japan

[21] Appl. No.: 479,247

[22] Filed: Feb. 13, 1990

[30] Foreign Application Priority Data

Feb. 13, 1989 [JP] Japan .................. 1-31075

[51] Int. Cl.⁵ .............................. H04N 5/04
[52] U.S. Cl. ..................... 358/158; 358/145
[58] Field of Search ........... 358/145, 154, 193, 158, 358/195.1, 197, 198

[56] References Cited

U.S. PATENT DOCUMENTS

| | | | |
|---|---|---|---|
| 3,952,143 | 4/1976 | Siwko | 358/195.1 |
| 4,222,073 | 9/1983 | Hirashima | 358/145 |
| 4,405,945 | 9/1983 | Sato | 358/154 |
| 4,467,359 | 8/1984 | Hosoya | 358/158 |
| 4,780,759 | 10/1988 | Matsushima et al. | 358/158 |
| 4,791,488 | 12/1988 | Fukazawa et al. | 358/158 |
| 4,812,783 | 3/1989 | Honjo et al. | 358/158 |
| 4,814,878 | 3/1989 | Kishi et al. | 358/158 |
| 4,933,767 | 6/1990 | Hyakutake | 358/195.1 |
| 4,942,469 | 7/1990 | Kanai | 358/153 |
| 4,996,596 | 2/1991 | Hirao et al. | 358/153 |
| 5,003,397 | 3/1991 | Wink | 358/195.1 |

Primary Examiner—James J. Groody
Assistant Examiner—Jeffrey S. Murrell
Attorney, Agent, or Firm—Cushman, Darby & Cushman

[57] ABSTRACT

A sound multiplex signal encoder circuit comprises a frequency modulator for modulating a sub-carrier wave, having a frequency twice as high as the frequency of a horizontal synchronizing signal of a video signal, with a sub-channel source sound signal. An automatic frequency control circuit generates a reference signal in accordance with the horizontal synchronizing signal of the video signal. A phase synchronizing circuit controls the frequency and the phase of the sub-carrier wave by supplying, to the frequency modulator, an error signal representing a phase difference between the sub-channel signal generated by the frequency modulator and the reference signal generated by the automatic frequency control circuit. A video signal detecting circuit detects whether a video signal is present, and stops the operation of the automatic frequency control circuit by means of a switch when no video signals are present.

14 Claims, 2 Drawing Sheets

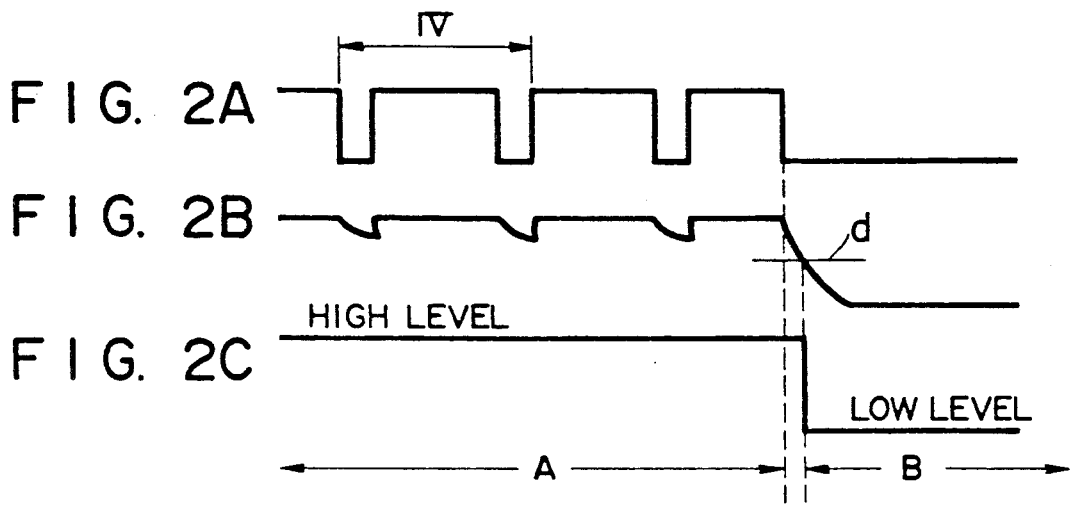
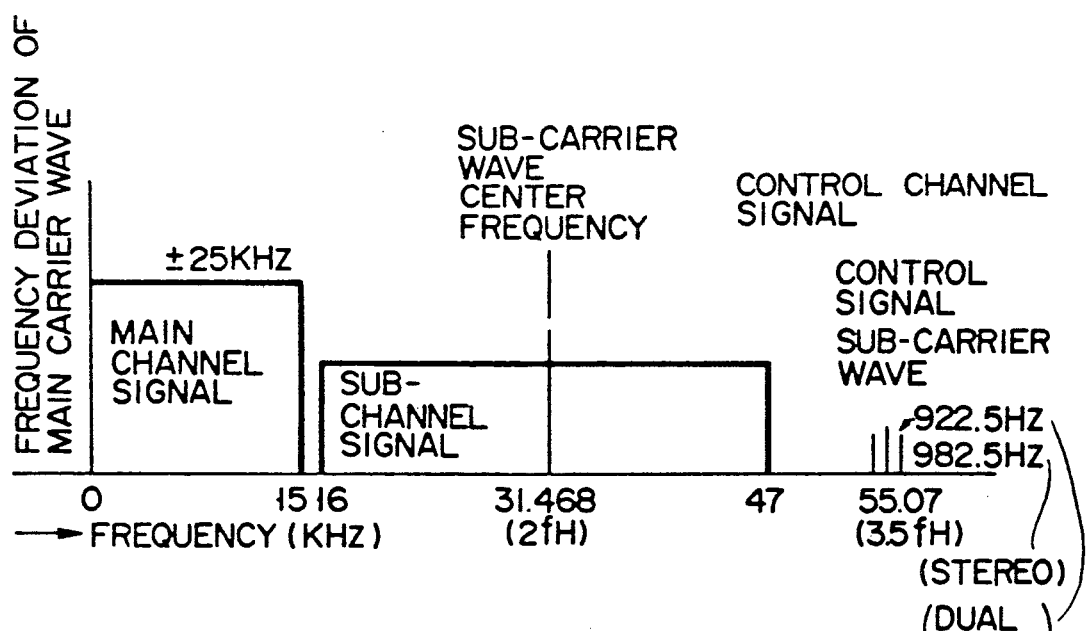
FIG. 3
(PRIOR ART)

SOUND MULTIPLEX SIGNAL ENCODER CIRCUIT WITH CONTROLLED AFC OPERATIONS

BACKGROUND OF THE INVENTION

1. Field of the Invention

The present invention relates to a sound multiplex signal encoder circuit, and more specifically to a sound multiplex signal encoder circuit in which a sub-channel signal is generated by modulating a sub-channel source sound signal.

2. Description of the Related Art

The sound multiplex modulation system of a television processes, for example, a sound multiplex signal in which a main channel signal, a sub-channel signal, and a multiplex control signal are superimposed. The sub-channel signal is obtained by frequency-modulating a sub-carrier wave with a sub-channel source sound signal. The frequency of the sub-carrier wave is set 2 fh higher than that of the main carrier wave, where fh is the frequency of a horizontal synchronizing signal, thereby to minimize the amount of buzz interruption due to the presence of a video signal, which is caused by the sound intercarrier system of a receiver.

Generally, in a sound multiplex signal encoder circuit used for sound multiplex broadcast, a PLL circuit controls the frequency of the sub-carrier wave, using a horizontal synchronizing signal included in a video signal as a reference signal. Hence, when no video signals are input, or when no horizontal synchronizing signals are detected for some reason, the frequency of the sub-carrier wave changes, inevitably causing the intercarrier signal and the 2 fh component of the video signal to generate beats in the receiver. Consequently, the receiver produces sweep sound while outputting sound.

SUMMARY OF THE INVENTION

It is accordingly an object of the present invention to provide a sound multiplex signal encoder circuit which operates stably even if no video signals are input or no horizontal synchronizing signals are detected.

To achieve this object, the sound multiplex signal encoder circuit of the present invention comprises:

a frequency modulator for modulating a sub-carrier wave, having a frequency which is higher than that of a horizontal synchronizing signal of the video signal by a positive-integer number of times, with a sub-channel source sound signal, thereby generating a sub-channel signal;

automatic frequency control means for generating a reference signal in accordance with the horizontal synchronizing signal in the video signal;

phase synchronizing means for controlling the frequency and the phase of the sub-carrier wave by supplying, to the frequency modulator, an error signal representing a phase difference between the sub-channel signal generated by the frequency modulator and the reference signal generated by the automatic frequency control means; and video signal detecting means for detecting whether a video signal is present or absent, and controlling the automatic frequency control means in accordance with the detection result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The above-described aspect and the other features of the present invention will be explained in detail below, with reference to the accompanying drawings.

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 2A to 2C are time charts for explaining an operation of the circuit shown in FIG. 1; and FIG. 3 is a spectrum diagram for explaining a television sound multiplex system.

DETAILED DESCRIPTION OF THE PREFERRED EMBODIMENT

Figure 1:
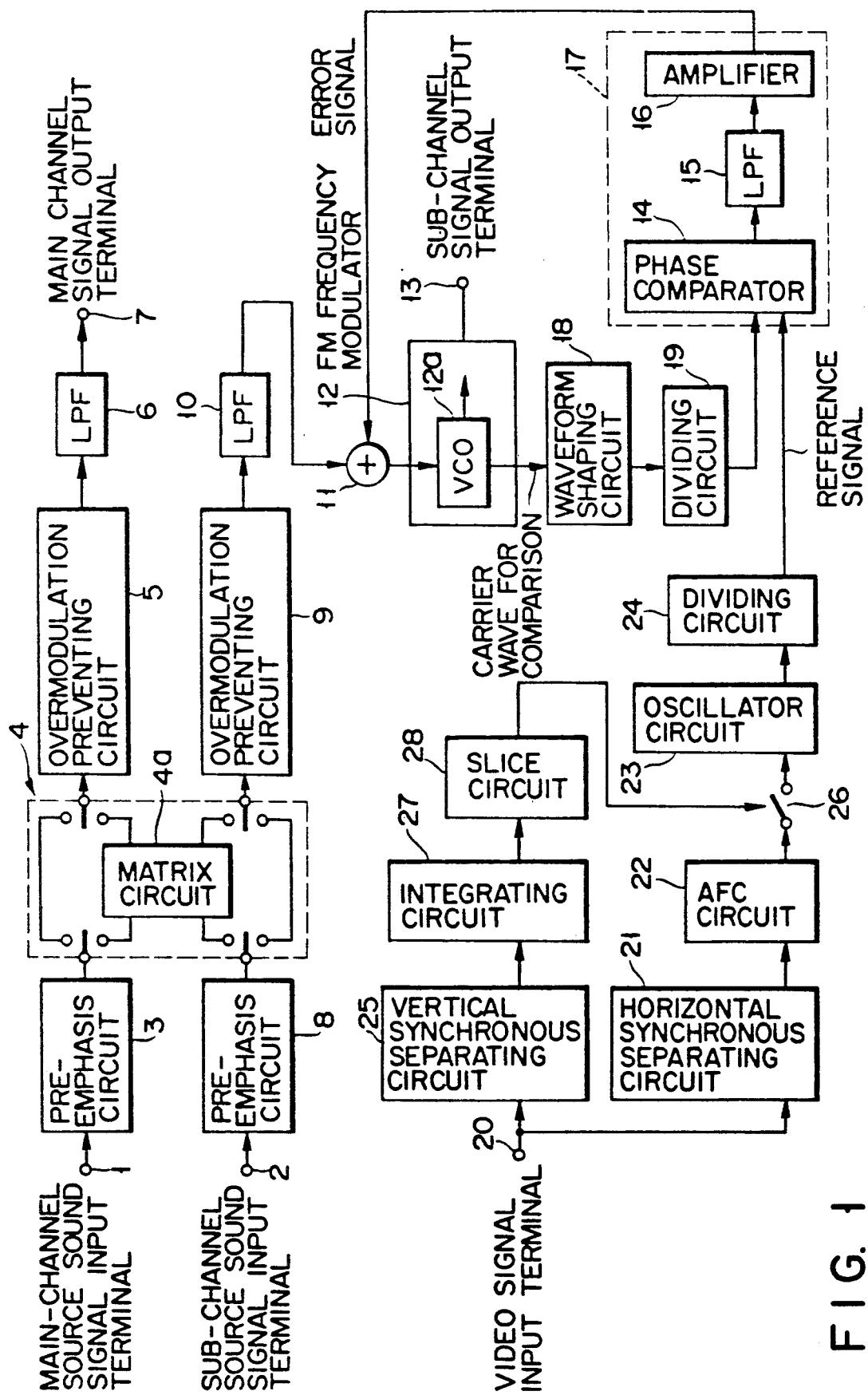
FIG. 1 is a circuit diagram of a sound multiplex signal encoder circuit according to an embodiment of the present invention.

Referring to FIG. 3, a sound multiplex modulating system will now be explained. Spectra of television sound signals used in Japan are as shown in FIG. 3. In FIG. 3, the abscissa represents frequencies and the ordinate represents spectra and deviations of the frequencies. A main channel signal, which is transferred by a main carrier wave, corresponds to a conventional sound signal, this sound signal being transferred as main sound data during dual sound broadcasting, and as L+R data during stereo broadcasting. The maximum range of deviation of the frequency of the main carrier wave is 25 KHz. A sub-channel signal is an FM signal, which is transferred by a sub-carrier wave having a frequency which is higher than that of the main carrier wave by 2 fH (where fH is the frequency of a horizontal synchronizing signal). The sub-carrier wave transfers sub-sound data during dual sound broadcasting and L-R data during stereo broadcasting, and is frequency-deviated by ±10 KHz at most by a source signal of the sub-channel signal (a sub-channel source sound signal). To generate a control channel signal, the carrier wave of about 55.07 KHz is amplitude-modulated with the sine wave of 922.5 Hz during dual sound broadcasting, and with the sine wave of 982.5 Hz during the stereo broadcasting.

In the above-described TV sound multiplex signal, the sub-carrier wave is set at a frequency of 2 fH in order to ensure that buzz interruption due to the presence of a video signal will not occur, when the sound intercarrier system of the receiver is used.

FIG. 1 is a circuit diagram showing a sound multiplex signal encoder circuit according to an embodiment of the present invention. In FIG. 1, reference numerals 1 and 2 denote input terminals for receiving a main- and a sub-channel source sound signals, respectively. The main channel source sound signal is input via preemphasis circuits 3 to sound multiplex switching circuit 4, which has a matrix circuit 4a. During dual sound broadcasting, the main- and sub-channel source sound signals are output as they are, whereas during stereo broadcasting, these signals are matrix-output (output as an L+R signal and an L-R signal).

The signal output from the terminal of sound multiplex switching circuit 4 of the main channel side is supplied to output terminal 7 as a main channel signal via overmodulation preventing circuit 5 and LPF (low-pass filter) 6. On the other hand, the signal output from the sub-channel side terminal of switching circuit 4 is supplied via overmodulation-preventing circuit 9 and LPF 10 to adder 11. The output of adder 11 is input to frequency modulator 12, which has VCO 12a. Frequency modulator 12 frequency-modulates a sub-carrier wave with the sub-channel source sound signal and outputs the modulated signal as a sub-channel signal which is supplied to output terminal 13.

The oscillation frequency of VCO 12a is controlled by PLL circuit 17 which comprises phase comparator 14, LPF 15, and amplifier 16. For this purpose, VCO 12a also outputs a carrier wave for comparison, which is unmodulated. The unmodulated carrier wave is supplied to waveform shaping circuit 18 and subsequently to dividing circuit 19, and input as a signal to phase comparator 14, where it is compared with a reference signal therein. On the basis of the comparison result, a PLL error signal is generated and supplied to adder 11, where it is synchronized with the the sub-channel source sound signal from LPF 10, and the synchronized signal input to VCO 12a.

A video signal input via terminal 20 is supplied to vertical synchronous separating circuit 25 and horizontal synchronous separating circuit 21. The horizontal synchronizing signal separated and extracted by horizontal synchronous separating circuit 21 is input to automatic frequency control circuit (AFC circuit) 22, which comprises a phase comparison circuit for comparing the horizontal synchronizing signal supplied from horizontal synchronous separating circuit with the reference signal which is to be supplied to the PLL circuit. The output of the phase comparison circuit is supplied via switch 26 to oscillator circuit 23. Thus, the frequency of a signal output from oscillator circuit 23 is rendered the same as the horizontal synchronous frequency. The frequency of a signal output from VCO 12a is controlled by PLL circuit 17, so that the frequency of the sub-carrier wave is kept twice as high as the horizontal synchronous frequency fH of the given video signal. A horizontal synchronizing signal separated by the horizontal synchronous separating circuit is input to AFC circuit 22, and is not used as a reference signal. Instead, an output signal of oscillator circuit 23, having the same frequency as that of the horizontal synchronizing signal, is used for this purpose.

To be specific, the output of oscillator circuit 23 is used as a reference signal for the following reasons:

Horizontal synchronous separating circuit 21 is a type of bypass filter. Hence, if the output of the separating circuit is used as a reference signal, PLL circuit 17 cannot operate stably because of the pulse noise included in the output. Therefore, as in an ordinary TV receiver, horizontal oscillator circuit 23 is provided in order to detect the phase difference between the frequency of the horizontal synchronizing signal and the oscillation frequency. Thus, the signal output from the horizontal synchronous separating circuit is frequency-controlled by the AFC circuit, and supplied as a reference signal to PLL circuit 17.

Switch 26 is controlled so as to close when a vertical synchronizing signal is separated and detected by vertical synchronous separating circuit 25, and open when a vertical synchronizing signal is not detected. More specifically, the signal output from vertical synchronous separating circuit 25 is integrated by integrating circuit 27. In this case, the integration time constant is set at a value longer than a vertical period (1 V), and the output of integrating circuit 27 is sliced at a level by slice circuit 28.

Accordingly, when a video signal is supplied to terminal 20 and a pulse signal of a vertical period is separated by vertical synchronous separating circuit 25, switch 26 is closed, so that AFC circuit 22 is operated. As a result, the same operation as in the conventional sound multiplex signal encoder is performed. On the other hand, when no video signals are supplied to terminal 20, no pulse signal is separated by vertical synchronous separating circuit 25, and switch 26 is opened. As a result, there is no output from AFC circuit 22 to be supplied to oscillator circuit 23, in which case, oscillator circuit 23 operates in the self-operation mode, and outputs, to phase comparator 14, a reference signal having a self-oscillation frequency.

FIGS. 2A to 2C are time charts for explaining in detail the operation of the sound multiplex signal encoder circuit as described above. FIG. 2A shows a vertical synchronizing signal separated by vertical synchronous separating circuit 25, FIG. 2B shows an output of integrating circuit 27, and FIG. 2C shows an output of slice circuit 28.

While a video signal is being input to terminal 20 (during a period A), pulse signals in a vertical period V are output from vertical synchronizing circuit 25, as shown in FIG. 2A, and input into integrating circuit 27. In integrating circuit 27, the pulse signals are converted to a direct current component having a level higher than the threshold level d set in slice circuit 28 (see FIG. 2B, the waveform of the output of the integrating circuit). Then, upon receiving the output of integrating circuit 27, slice circuit 28 generate a slice output of a logically high level, thereby controlling switch 26 so as to close.

On the other hand, when no video signals are input through terminal 20 (during a period B), pulse signals in a vertical period are not separated by vertical synchronous separating circuit 25. For this reason, the level of the output of the integrating circuit is lowered. When the output of the integrating circuit is lower than the level d, the slice output is rendered logically low in level. As a result, switch 26 is opened.

Thus, when a video signal is not supplied, the AFC operation is canceled, and oscillator circuit 23 operates in the self-operation mode and output a reference signal of the self-oscillation frequency to PLL circuit 17. Since oscillator circuit 23 continues operating, keeping the self-oscillation frequency at a predetermined value, the operation is more stable than in a case where it is controlled by the AFC circuit. As a result, the frequency of the sub-carrier wave is stable, and no sweep sound interrupts a sound signal on the receiver side.

The present invention is not limited to the above-described embodiment. For example, vertical synchronous separating circuit 25 may be substituted by any other means which can determine whether a video signal is present or not. For example, the presence or absence of a video signal can be determined on the basis of the output of horizontal synchronous separating circuit 21. Further, if a VCO is used in place of oscillator circuit 23, the VCO can output a stationary voltage when no video signals are supplied.

As has been described above, according to the present invention, when a sub-channel signal is generated in a sound multiplex encoder, variation of the frequency of the sub-carrier wave is suppressed, and the sound signal in the receiver is protected against being interrupted by noise.

What is claimed is:

1. A sound multiplex signal encoder circuit, comprising:
   a frequency modulator for modulating a sub-carrier wave, having a frequency an integer times as high as that of a horizontal synchronizing signal of a video signal, with a sub-channel source sound signal, thereby generating a sub-channel signal to an output terminal;
   reference signal generating means, including oscillating means and automatic frequency control means for controlling said oscillating means, said oscillating means oscillating in a first state of self-oscillation and in a second state wherein said oscillating means oscillates in synchronization with the horizontal synchronizing signal of the video signal and under control of the automatic frequency control means, said oscillating means generating a reference signal in either of said first and second states;
   phase synchronizing means for controlling a frequency and a phase of the sub-channel signal by supplying to the frequency modulator an error signal representing a phase difference between the sub-channel signal generated by the frequency modulator and the reference signal generated by the reference signal generating means;
   video signal detecting means for detecting whether a video signal is present, and stopping said generating by the automatic frequency control means when said video signal is absent; and
   oscillation control means including switching means for switching the oscillating means between said first and second states in accordance with detection performed by the video signal detecting means, said oscillation control means oscillating the oscillating means in said second state when presence of a video signal is detected, and oscillating the oscillating means in said first state when absence of a video signal is detected.

2. A sound multiplex signal encoder circuit according to claim 1, wherein said switching means includes a switch circuit for determining connection of the automatic frequency control means to the oscillating means.

3. A sound multiplex signal encoder circuit according to claim 2, wherein said switch circuit is turned on when said slice output has a high level.

4. A sound multiplex signal encoder circuit according to claim 1, wherein said video signal detecting means includes a vertical synchronous separating means for separating a vertical synchronizing signal from said video signal, and integrating circuit for integrating said vertical synchronizing signal and generating an integral output, and a slice circuit for slicing said integral output and generating a slice output, and wherein said switching means is controlled in accordance with a level of said slice output.

5. A sound multiplex signal encoder circuit according to claim 4, wherein an integral time constant of said integrating circuit is longer than a vertical period of said vertical synchronizing signal.

6. A sound multiplex signal encoder circuit, comprising:
   a frequency modulator for modulating a sub-carrier wave, having a frequency an integer times as high as that of a horizontal synchronizing signal of a video signal, with a sub-channel source sound signal, thereby generating a sub-channel signal to an output terminal;
   automatic frequency control means for generating a reference signal in accordance with the horizontal synchronizing signal of the video signal;
   phase synchronizing means for controlling a frequency and a phase of the sub-channel signal by supplying to the frequency modulator an error signal representing a phase difference between the sub-channel signal generated by the frequency modulator and the reference signal generated by the automatic frequency control means; and
   video signal detecting means for detecting whether a video signal is present or absent, and stopping said generating by the automatic frequency control means when said video signal is absent;
   wherein said video signal detecting means comprises a switch circuit for said stopping.

7. A sound multiplex signal encoder circuit, comprising:
   a frequency modulator for modulating a sub-carrier wave, having a frequency an integer times as high as that of a horizontal synchronizing signal of a video signal, with a sub-channel source sound signal, thereby generating a sub-channel signal to an output terminal;
   automatic frequency control means for generating a reference signal in accordance with the horizontal synchronizing signal of the video signal;
   said automatic frequency control means comprising an oscillator circuit which generates a reference signal of a self-oscillation frequency when said automatic frequency control means stops operating;
   phase synchronizing means for controlling a frequency and a phase of the sub-channel signal by supplying to the frequency modulator an error signal representing a phase difference between the sub-channel signal generated by the frequency modulator and the reference signal generated by the automatic frequency control means; and
   video signal detecting means for detecting whether a video signal is present or absent, and stopping said generating by the automatic frequency control means when said video signal is absent.

8. A sound multiplex signal encoder circuit, comprising:
   a frequency modulator for modulating a sub-carrier wave, having a frequency an integer times as high as that of a horizontal synchronizing signal of a video signal, with a sub-channel source sound signal, thereby generating a sub-channel signal to an output terminal;
   automatic frequency control means for generating a reference signal in accordance with the horizontal synchronizing signal of the video signal;
   phase synchronizing means for controlling a frequency and a phase of the sub-channel signal by supplying to the frequency modulator an error signal representing a phase difference between the sub-channel signal generated by the frequency modulator and the reference signal generated by the automatic frequency control means; and video signal detecting means for detecting whether a video signal is present or absent, and stopping said generating by the automatic frequency control means when said video signal is absent;

wherein said video signal detecting means comprises:
a vertical synchronous separating circuit for separating a vertical synchronizing signal from the video signal,
an integrating circuit for integrating the vertical synchronizing signal and generating an integral output,
a slice circuit for slicing the integral output and generating a slice output, and
a switch circuit for switching on/off said automatic frequency control means in accordance with the level of the slice output.

9. A sound multiplex signal encoder circuit according to claim 8, wherein said switch circuit is turned on when the slice output has a level higher than a threshold.

10. A sound multiplex signal encoder circuit according to claim 8, wherein a time constant of said integrating circuit is longer than a vertical period of the vertical synchronizing signal.

11. A sound multiplex signal encoder circuit, comprising:
a frequency modulator for modulating a sub-carrier wave, having a frequency an integer times as high as that of a horizontal synchronizing signal of a video signal, with a sub-channel source sound signal, thereby generating a sub-channel signal to an output terminal;
automatic frequency control means for generating a reference signal in accordance with the horizontal synchronizing signal of the video signal;
said automatic frequency control means comprising an oscillator circuit which generates a reference signal of a self-oscillation frequency when said automatic frequency control means stops operating;
phase synchronizing means for controlling a frequency and a phase of the sub-channel signal by supplying to the frequency modulator an error signal representing a phase difference between the sub-channel signal generated by the frequency modulator and the reference signal generated by the automatic frequency control means; and
video signal detecting means for detecting whether a video signal is present or absent, and stopping said generating by the automatic frequency control means when said video signal is absent.

12. A sound multiplex signal encoder circuit, comprising:
a frequency modulator for modulating a sub-carrier wave, having a frequency an integer times as high as that of a horizontal synchronizing signal of a video signal, with a sub-channel source sound signal, thereby generating a sub-channel signal to an output terminal;
automatic frequency control means for generating a reference signal in accordance with the horizontal synchronizing signal of the video signal;

phase synchronizing means for controlling a frequency and a phase of the sub-channel signal by supplying to the frequency modulator an error signal representing a phase difference between the sub-channel signal generated by the frequency modulator and the reference signal generated by the automatic frequency control means; and
video signal detecting means for detecting whether a video signal is present or absent, and stopping said generating by the automatic frequency control means when said video signal is absent;
an integrating circuit for integrating the vertical synchronizing signal and generating an integral output; and
a slice circuit for slicing the integral output and generating a slice output.

13. A sound multiplex signal encoder circuit comprising:
a frequency modulator for modulating a sub-carrier wave, having a frequency two times as high as that of a horizontal synchronizing signal of a video signal, with a sub-channel source sound signal, thereby generating a sub-channel signal;
reference signal generating means, including oscillating means and automatic frequency control means for controlling said oscillating means, said oscillating means being capable of oscillating in a first state of self-oscillation and in a second state wherein said oscillating means oscillates in synchronization with the horizontal synchronizing signal of the video signal and under control of the automatic frequency control means, said oscillating means generating a reference signal in either of said first and second states;
phase synchronizing means for controlling a frequency and a phase of the sub-channel signal by supplying to the frequency modulator an error signal representing a phase difference between the sub-channel signal generated by the frequency modulator and the reference signal generated by the reference signal generating means;
a vertical synchronizing signal detecting means for detecting a vertical synchronizing signal in the video signal; and
oscillation control means including switching means for switching the oscillating means between said first and second states in accordance with detection performed by the vertical synchronizing signal detecting means, said oscillation control means oscillating the oscillating means in said second state when presence of a vertical synchronizing signal is detected, and oscillating the oscillating means in said first state when absence of a vertical synchronizing signal is detected.

14. A sound multiplex signal encoder circuit according to claim 13, further comprising an integrating circuit for integrating a vertical signal synchronizing signal detected by the vertical synchronizing signal detecting circuit and for generating an integral output, and a slice circuit for slicing said integral output, generating a slice output, and supplying said integral output to said switching means.

* * * * *